(12) United States Patent
Peinhardt et al.

(10) Patent No.: US 9,813,992 B2
(45) Date of Patent: Nov. 7, 2017

(54) TRACKING SYSTEMS AND METHODS FOR REMOTELY TRACKING A LOCATION OF A PERSON ON A MAP OF A MONITORED PREMISE

(71) Applicant: MCP LLC, Gearhart, OR (US)

(72) Inventors: Matthew Peinhardt, Gearhart, OR (US); John Bidwell, St. Petersburg, FL (US)

(73) Assignee: MCP LLC, Gearhart, OR (US)

( * ) Notice: Subject to any disclaimer, the term of this patent is extended or adjusted under 35 U.S.C. 154(b) by 81 days.

(21) Appl. No.: 14/562,235

(22) Filed: Dec. 5, 2014

(65) Prior Publication Data
US 2015/0160328 A1    Jun. 11, 2015

Related U.S. Application Data

(60) Provisional application No. 61/912,919, filed on Dec. 6, 2013.

(51) Int. Cl.
| | | |
|---|---|---|
| H04W 24/00 | (2009.01) | |
| H04W 52/02 | (2009.01) | |
| H04W 4/02 | (2009.01) | |
| H04W 4/04 | (2009.01) | |
| G01S 5/00 | (2006.01) | |
| G01S 5/02 | (2010.01) | |
| G01S 5/14 | (2006.01) | |

(52) U.S. Cl.
CPC ....... *H04W 52/0251* (2013.01); *G01S 5/0036* (2013.01); *G01S 5/0252* (2013.01); *G01S 5/14* (2013.01); *H04W 4/023* (2013.01); *H04W 4/028* (2013.01); *H04W 4/043* (2013.01); *Y02B 60/50* (2013.01)

(58) Field of Classification Search
CPC . H04W 52/0251; H04W 4/023; H04W 4/028; H04W 4/043; G01S 5/0036; G01S 5/0252; G01S 5/14; Y02B 60/50
USPC ............. 455/456.1–456.3, 404.2, 414.2, 440
See application file for complete search history.

(56) References Cited

U.S. PATENT DOCUMENTS

| | | |
|---|---|---|
| 6,894,617 B2 | 5/2005 | Richman |
| 7,990,268 B2 | 8/2011 | Richman |
| 8,040,219 B2 * | 10/2011 | Haartsen .............. G01C 21/206 340/539.11 |
| 8,174,378 B2 | 5/2012 | Richman et al. |

(Continued)

FOREIGN PATENT DOCUMENTS

WO    2013172877 A1    11/2013

*Primary Examiner* — Keith Fang
*Assistant Examiner* — B. M. M Hannan
(74) *Attorney, Agent, or Firm* — Benedict R. Dugan; Lowe Graham Jones PLLC

(57) ABSTRACT

Techniques tracking, monitoring, updating, and displaying location and related information based on telemetry information received from mobile devices carried in the field. Each tracked entity (e.g., person, robot) carries or is associated with a mobile device. When a mobile device enters within range of a checkpoint associated with a known position, the mobile device notifies a central server or other system (e.g., a peer device), which then makes the received information (or information derived therefrom) available to other devices and/or systems. In some cases, the checkpoint devices are wireless network access points, such as Wi-Fi routers, access points, media device, or the like.

18 Claims, 19 Drawing Sheets

(56) References Cited

U.S. PATENT DOCUMENTS

| | | | | |
|---|---|---|---|---|
| 8,385,943 B1* | 2/2013 | Han | | H04W 4/028 455/404.2 |
| 8,700,054 B2* | 4/2014 | Kadous | | H04W 4/021 455/456.1 |
| 8,880,081 B2* | 11/2014 | Kolavennu | | H04W 16/18 455/418 |
| 8,983,490 B2* | 3/2015 | Un | | H04W 64/00 455/456.1 |
| 9,055,451 B2* | 6/2015 | Kim | | H04W 64/00 |
| 9,198,004 B2* | 11/2015 | Das | | G01C 21/206 |
| 2005/0169214 A1* | 8/2005 | Suomela | | G08C 17/02 370/331 |
| 2005/0260973 A1* | 11/2005 | van de Groenendaal | | H04L 63/102 455/411 |
| 2006/0071783 A1* | 4/2006 | Culpepper | | B60R 25/102 340/539.13 |
| 2006/0176849 A1* | 8/2006 | Gass | | H04W 64/00 370/328 |
| 2011/0103360 A1* | 5/2011 | Ku | | G01S 5/021 370/338 |
| 2012/0056785 A1* | 3/2012 | Jovicic | | G01S 5/0236 342/450 |
| 2012/0154148 A1* | 6/2012 | Mohandes | | G08B 21/0275 340/539.13 |
| 2012/0172052 A1* | 7/2012 | Jeong | | G01S 5/0252 455/456.1 |
| 2012/0315918 A1* | 12/2012 | Kadous | | H04W 4/021 455/456.1 |
| 2013/0155102 A1* | 6/2013 | Gonia | | H04W 64/00 345/629 |
| 2013/0281084 A1* | 10/2013 | Batada | | H04W 4/008 455/426.1 |
| 2013/0290096 A1* | 10/2013 | Lizotte, III | | G06Q 30/0246 705/14.45 |
| 2014/0106773 A1* | 4/2014 | Li | | H04W 4/043 455/456.1 |
| 2014/0141800 A1* | 5/2014 | Eum | | H04W 4/043 455/456.1 |
| 2014/0142846 A1* | 5/2014 | Chun | | G01C 21/206 701/519 |
| 2014/0171118 A1* | 6/2014 | Marti | | G01S 5/0252 455/456.3 |
| 2014/0206382 A1* | 7/2014 | Shabtay | | G01S 5/0289 455/456.1 |
| 2014/0243017 A1* | 8/2014 | Das | | G01C 21/206 455/456.2 |
| 2015/0208264 A1* | 7/2015 | Koskinen | | H04W 52/0212 455/67.11 |
| 2016/0044627 A1* | 2/2016 | Aggarwal | | H04W 4/04 455/456.1 |
| 2016/0047663 A1* | 2/2016 | Iyer | | G01C 21/206 701/411 |
| 2016/0157057 A1* | 6/2016 | Kim | | G01S 5/02 455/456.3 |

* cited by examiner

IOIO Flowchart

Mobile Device Flowchart

Server Flowchart

*Fig. 5A*

*5100*: A process in a mobile device carried by a tracked person

*5101*: tracking movement of the person about a monitored premises that includes multiple checkpoint devices that are configured to communicate wirelessly with the mobile device, by:

*5102*: wirelessly receiving checkpoint data from a first one of the checkpoint devices

*5103*: determining whether or not the checkpoint data can be transmitted to a remote tracking system

*5104*: when it is determined that the checkpoint data can be transmitted, transmitting the checkpoint data to the tracking system

*5105*: when it is determined that the checkpoint data cannot be transmitted, locally storing the checkpoint data for later transmission to the tracking system

Fig. 5B

5200: The process of 5100, further comprising:

5201: receiving tracking information from the tracking server

5202: presented the received tracking information on a display of the mobile device

Fig. 5C

5300: The process of 5200, wherein the monitored premises is a multistory building including multiple levels, and further comprising:

5301: presenting a map that displays a present location and an indication of a current level of the person within the monitored premises 5400: The process of 5100, further comprising:

5401: wirelessly receiving checkpoint data from a second one of the checkpoint devices 5402: determining a nearest one of the first and second checkpoint devices 5403: transmitting checkpoint data from the nearest one of the checkpoint devices to the tracking system

Fig. 5E

5500: A process in a tracking system in communication with a mobile device carried by a tracked person

5501: tracking movement of the person about a monitored premises that includes multiple checkpoint devices that are configured to communicate wirelessly with the mobile device, wherein at least some of the checkpoint devices are Wi-Fi network access devices, by:

5502: receiving checkpoint data from the mobile device, the checkpoint data based on a wireless interaction between the mobile device and one or more of the multiple checkpoint devices, the checkpoint data including network identifiers of the Wi-Fi network access devices

5503: storing checkpoint data received from the mobile device

5504: presenting tracking information based on the received checkpoint data

Fig. 5F

5600: The process of 5500, wherein the tracking movement of the person includes:

5601: receiving from the mobile device checkpoint data corresponding to multiple checkpoint devices, the received checkpoint data identifying each of the checkpoint devices and including a signal strength corresponding to each of the checkpoint devices

5602: determining, based on the signal strength corresponding to each of the multiple checkpoint devices, a location of the mobile device

Fig. 5G

5700: The process of 5500, wherein the tracking movement of the person includes:

5701: receiving multiple checkpoint identifiers

5702: for each of the multiple checkpoint identifiers, receiving a corresponding location indicator

5703: associating each of the multiple checkpoint identifiers with its corresponding location indicator

Fig. 5H

5800: The process of 5700, further comprising:

5801: presenting on a mobile device identifiers of multiple candidate checkpoint devices, each identifier presented with an associated signal strength

5802: receiving, based on a selection by a user of the mobile device of one of the presented checkpoint device identifiers, the selected checkpoint device identifier, a zone identifier, and a level identifier

5803: associating the selected checkpoint device identifier with the zone identifier and the level identifier

TRACKING SYSTEMS AND METHODS FOR REMOTELY TRACKING A LOCATION OF A PERSON ON A MAP OF A MONITORED PREMISE

TECHNICAL FIELD

The present disclosure relates to methods, techniques, and systems for tracking guards or other persons and, more particularly, to tracking and referencing the location of persons by way of mobile devices that are configured to receive checkpoint information from pre-existing or installed electronic checkpoint devices, and that are further configured to forward the checkpoint information to a tracking server or other device/system.

BRIEF DESCRIPTION OF THE DRAWINGS

FIGS. 5A-5H are flow diagrams of tracking processes performed by example embodiments.

DETAILED DESCRIPTION

Figure 1:
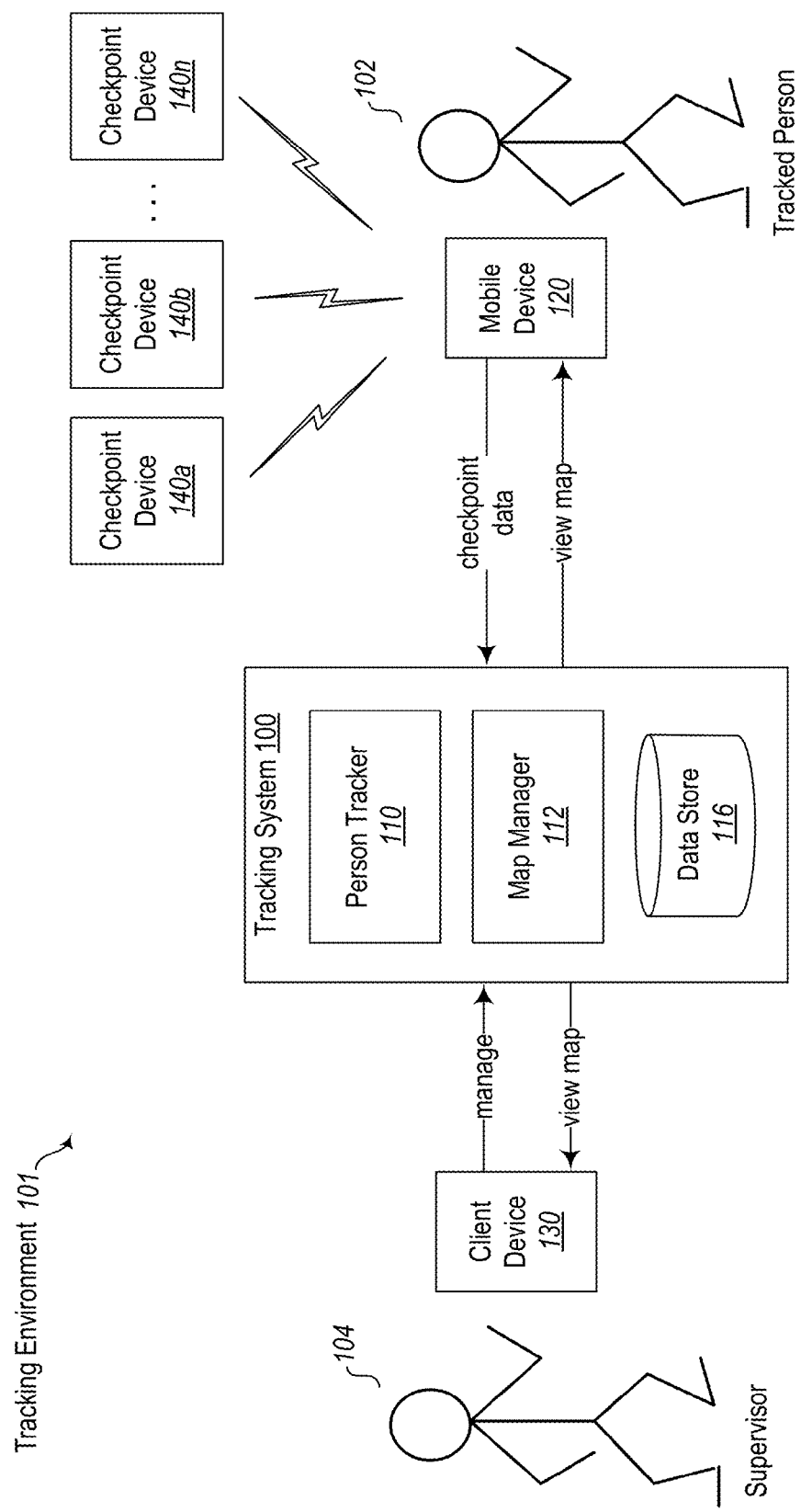
FIG. 1 is a block diagram of a tracking environment according to an example embodiment.

Embodiments described herein provide enhanced computer- and network-based awareness methods and systems for tracking, monitoring, updating, and displaying location and related information based on telemetry information received from mobile devices carried in the field. In typical embodiments, each tracked entity (e.g., person, robot) carries or is associated with a mobile device. When a mobile device enters within range of a checkpoint associated with a known position, the mobile device notifies a central server or other system (e.g., a peer device), which then makes the received information (or information derived therefrom) available to other devices and/or systems. The tracking information may be presented in various ways, including via a 2D or 3D map, via a textual display, or the like. As discussed further below, a checkpoint may be provided via a physical checkpoint device, including any device that is configured to communicate wirelessly with the mobile device, such as via Wi-Fi, Bluetooth, infrared, or the like. In other embodiments, a checkpoint may be defined as a location in 2D or 3D space. In such cases, the mobile device may additionally determine its proximity to the checkpoint by way of GPS or other positional mechanism.

In some embodiments, each premises (e.g., building, site, house, etc.) that is to be monitored is instrumented with checkpoint devices that are installed at known positions within the premises. The mobile devices that are carried by persons operating at the monitored premises are configured to receive from the checkpoint devices checkpoint data, and then forward that data to a tracking system. The tracking system operates as a centralized host for receiving and recording checkpoint information received from mobile devices. The tracking system also provides information about tracked persons in conjunction with a map or other display, so that a supervisor or other user can readily determine the location of the persons or other relevant information.

The described techniques facilitate live, substantially real-time monitoring of persons as they progress through a monitored premises. The described techniques address problems related to GPS based tracking, which often does not perform well inside of buildings and/or does not provide detailed elevation information. The use of checkpoint devices facilitates tracking a person in three dimensions with integrated maps, so that the floor or level of the person can also be tracked in a multi-story location. In some embodiments, Wi-Fi or other signal triangulation is used to determine the location of a person or device in a three-dimensional field.

The inventive tracking techniques are described in some embodiments with respect to guards who are employed to monitor a particular premises. Although tracking guards is used as a specific example for explanatory purposes, the techniques may be applied in other contexts, with other types of persons, or with remote work-force management generally. For example, the location and movements of medical staff, maintenance personnel, janitorial personnel, health-care personnel, robots, vehicles, or other types of workers, employees, participants, or the like may also or instead be tracked. Generally, any person carrying the described mobile device in a premises that has been instrumented with the described checkpoint devices (whether using Wi-Fi, Bluetooth, or some other signaling technology) can be tracked. For example, the techniques may be employed in game context (e.g., capture the flag, laser tag), in which participants or players carry the described mobile devices, so that their location can be monitored or shared with other players. As another example, the techniques may be employed in a retail or entertainment context (e.g., a shopping mall, big box store, amusement park), so that family or group members can keep track of one another, or so that a manager can track the location of employees and/or customers. As yet another example, the techniques can be used to track a cleaning service or other consecutive routine location-to-location based work.

1. Tracking Environment Overview

FIG. 1 is a block diagram of a tracking environment according to an example embodiment. In particular, FIG. 1 shows a tracking environment 101 that includes a tracking system 100, a mobile device 120, a client device 130, and multiple checkpoint devices 140a-140n.

Initially, the checkpoint devices 140 are positioned throughout the monitored premises at known positions. The checkpoint devices 140 are typically small, self-contained computing devices that can communicate over short ranges with the mobile device 120, other checkpoint devices, or the like. Each checkpoint device 140 may store a unique identifier or other information that can be used to identify the device and/or its location.

The mobile device 120 is carried and operated by a tracked person 102. The mobile device 120 is typically a smart phone, but may be a tablet computer, smart watch, or the like. The mobile device detects a wireless signal transmitted by the checkpoint devices 140. Note that the mobile device 120 need not necessarily transmit information to the checkpoint devices 140. In other words, communication may be unidirectional from the checkpoint devices 140 to the mobile device 120. In some embodiments, the mobile device 120 and checkpoint devices 140 communicate via the Wi-Fi protocol, although other wireless protocols may be used, including Bluetooth, infrared, an image (e.g., a QR code), or the like. Typically, when the tracked person 120 comes within range of one of the checkpoint devices 140, the mobile device 120 receives from the checkpoint device 140 checkpoint data, which may include a checkpoint identifier, MAC address, SSID (service set identifier), or other information that can be used to identify the checkpoint device 140 and/or its position. The mobile device 120 then forwards the received checkpoint data to the tracking system 100.

In some embodiments, at least some of the checkpoint devices 140 are sources of Wi-Fi signals. In such embodiments, the checkpoint device 140 may be a Wi-Fi router or access point. Other types of devices that emit Wi-Fi signals may also be used, including personal computers (e.g., a desktop PC in an office), smart televisions, media sharing devices, appliances (e.g., a networked refrigerator), and the like. In such cases, the checkpoint device 140 is not a custom device, and requires no special configuration. Instead, a unique identifier associated with each checkpoint device 140 (e.g., a MAC address or SSID) is associated with a corresponding checkpoint location. During operation, the mobile device 120 scans the available Wi-Fi signals and transmits the identifier corresponding to the strongest signal to the tracking system 100.

In some cases, triangulation may be performed, where the location of the mobile device 120 may be estimated based on two or more wireless signals. For example, assume that the mobile device 120 reads a first signal received from a first checkpoint device and a second signal received from a second checkpoint device. If the received signals are equally strong (and the transmitters are known to be of equal strength), the position of the mobile device 120 may be estimated as being somewhere along a first line that is perpendicular to and runs through a second line connecting the two checkpoint devices. The signal strength may be further used to estimate the position along the first line, such that stronger signal means that the mobile device is nearer the second line. Location may be more accurately estimated by reference to three more signals. Some embodiments may also take into account the strength of the transmitter of the checkpoint device.

Motion of the mobile device 120 may also be determined with reference to signal strength and/or multiple signals. For example, in the scenario above, where two signals are considered, if the first signal becomes stronger as the second signal weakens, it may be inferred that the mobile device is moving towards the first checkpoint device.

The tracking system 100 performs tracking, mapping, maintaining resources, and other functions related to managing the operation of the tracking environment 101. In the illustrated embodiment, the tracking system 100 includes a person tracker 110, a map manager 112, and a data store 116. The person tracker 110 receives checkpoint data and other information from the mobile device 120, and stores the received data in the data store 116. The map manager 112 aggregates data related to the location of the tracked person 102 with a map of the monitored premises. Map and other information related to the movement and location of tracked persons is provided by the map manager 112 to the mobile device 120 and/or the client device 130. Map-based views may be annotated with various kinds of information about the tracked person, including date and time stamps indicating time of last communication, time at checkpoint, time at previous checkpoints, or the like. Locations may be described and represented in various ways, including by GPS (lat/long) coordinates, descriptive names (e.g., "Building A, Floor 3, main hallway"), or the like.

The client device 130 is operated by a supervisor 130 or other person who is monitoring the movement and location of the tracked person 102. The client device 130 may be any mobile or stationary computing device or system that can communicate with the tracking system 100. In some embodiments, the client device 130 may also be configured to operate as another mobile device 120, such as the one operated by the tracked person 102. The supervisor 130 uses the client device 130 to access and manage the tracking system 100, such as by establishing or providing map information about a monitored premises, tracked person information (e.g., user identifiers, passwords, etc.), checkpoint information (e.g., regarding the positions of the various checkpoint devices 140), and the like. The supervisor 130 also uses the client device to view maps or otherwise track the progress of tracked persons about a monitored premises.

The communication between all of the illustrated devices may be secured, such as by using various known encryption and authentication techniques. For example, communication between the mobile device 120 (or the client device 130) and the tracking server may be performed via HTTPS or other secure protocol. Also, the illustrated devices and systems may require user authentication (e.g., user name and password) to access the tracking server or perform other functions. In other embodiments, one or more of the illustrated devices may be presented as a read-only components that interact with another device (e.g., checkpoint device) and load relevant information from the network.

Note that architectures other than that shown with respect to FIG. 1 are contemplated. In particular, other embodiments may not include, utilize, or rely upon a centralized system/facilitator, such as the tracking system 100. Instead, such embodiments may use a peer-to-peer approach to perform at least some of their functions. For example, multiple mobile devices operated by tracked persons may locally share information collected with one another, without communicating that information via the tracking system 100.

In addition, the described techniques may be integrated with social networks or other ad-hoc networks of individuals. For example, in a retail (e.g., at a mall) or entertainment setting (e.g., a sports arena, a nightclub), users can use the mobile device to determine the locations of members of their social network, and thereby physically meet up with friends, acquaintances, or family members. In such cases, the tracking system 100 is configured to limit information sharing to only those mobile devices that are operated by users of a particular social network.

Figure 2A:
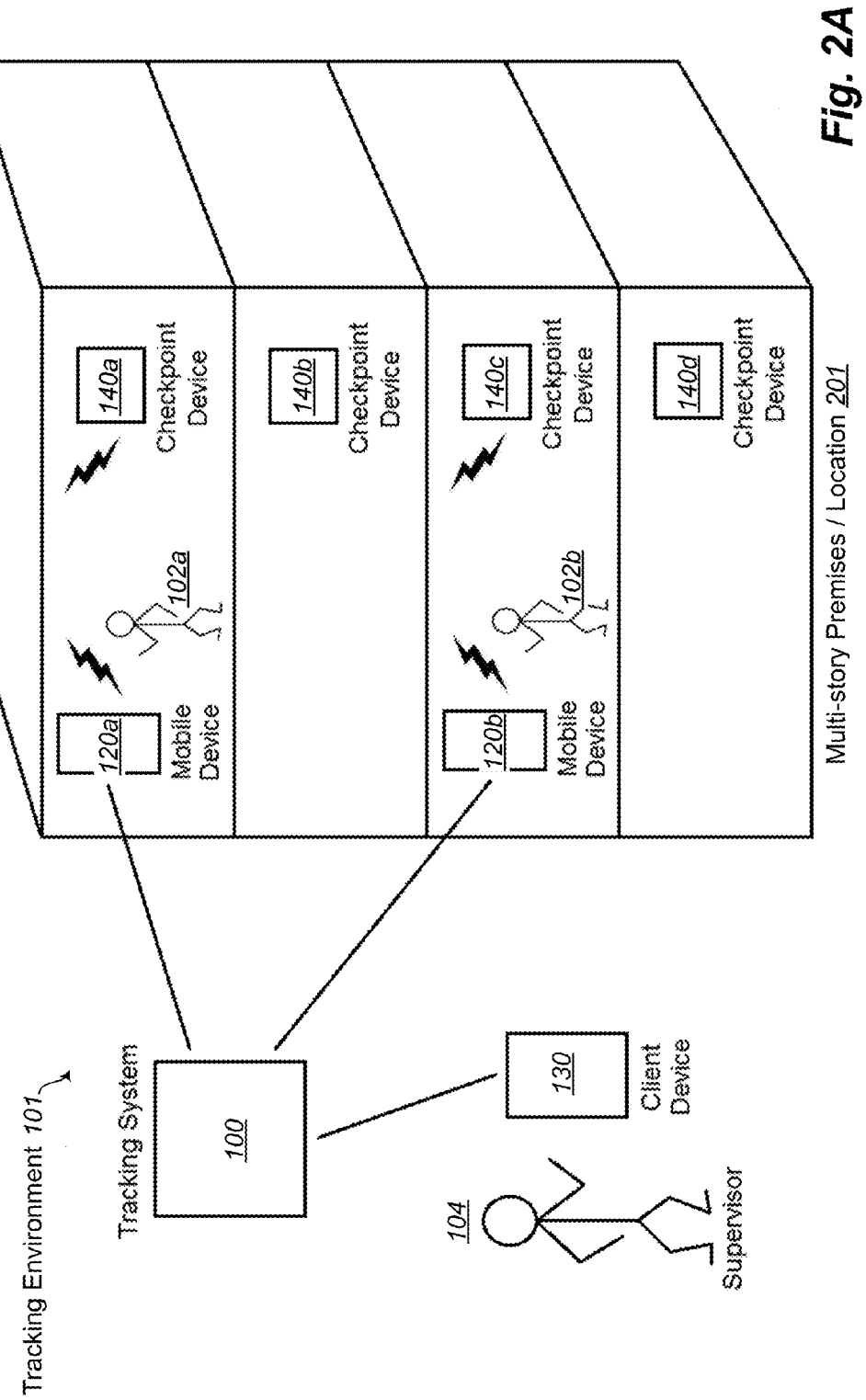
FIGS. 2A-2D are block diagrams illustrating tracking environments according to example embodiments.

FIGS. 2A-2D are block diagrams tracking environments according to example embodiments. In FIG. 2A, two mobile devices 120a and 120b are tracked via operation of checkpoint devices 140a-140c, each one placed on a distinct floor of a multi-story premises 201. Using the described techniques, three-dimensional location information may be provided to the supervisor 104 via the client device 130. For example, when mobile device 120a reports that it has received a signal from checkpoint device 140a, the client device 130 may report that the guard 102a is located on the top floor of the building. Similarly, when mobile device 120b reports its proximity to checkpoint device 104c, the client device 130 may report that the guard 102b is located on the second floor of the building.

Figure 2B:
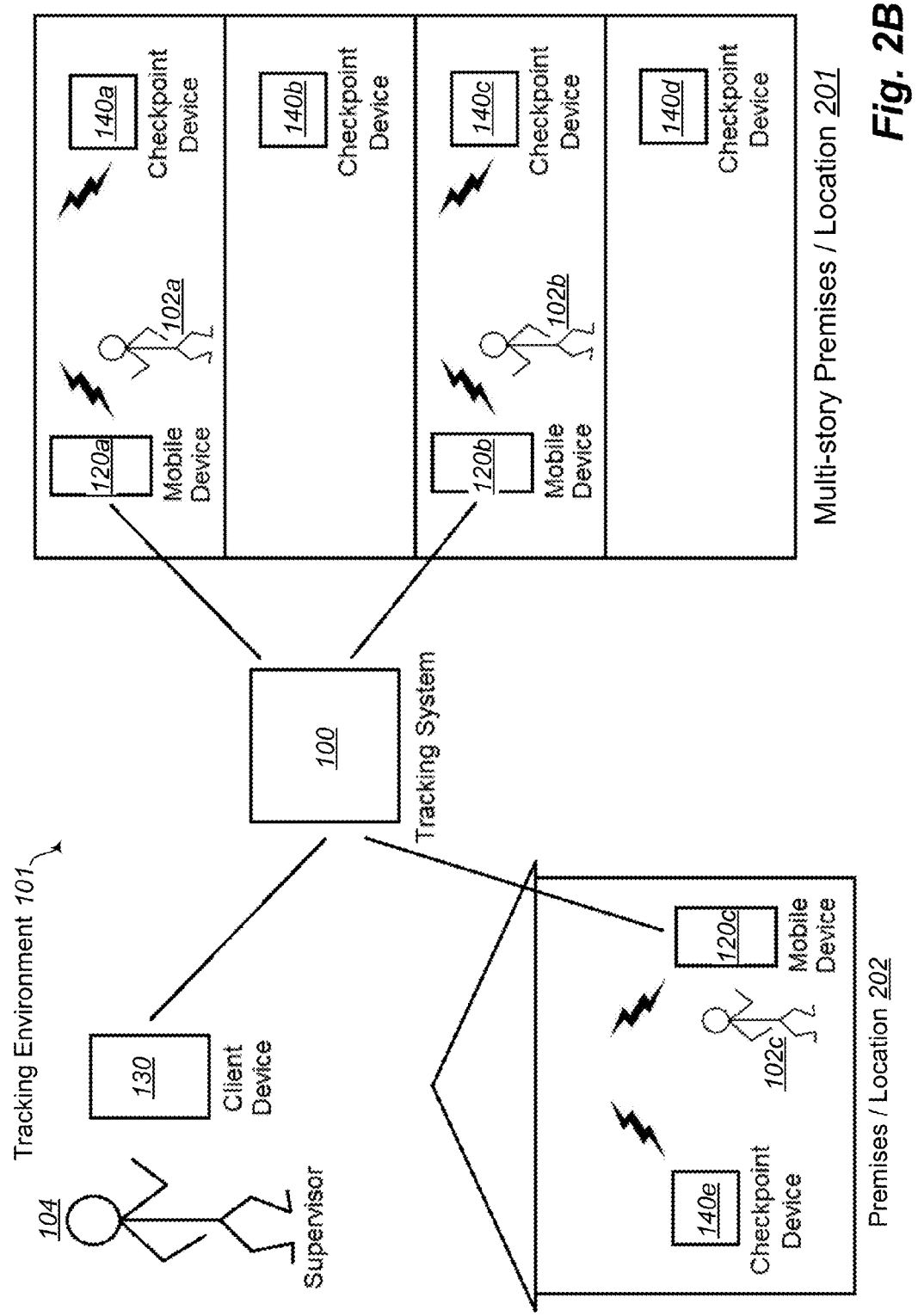

In FIG. 2B, multiple premises are tracked concurrently. The tracking system 100 monitors premises 201 (the multi-story building of FIG. 2A) as well as premises 202, which may be, for example, a home. In this example, the persons 102 is a cleaning person and the tracking system 100 is used to determine that the person 102c has visited the premises 202. The system 100 may also determine the length of time that the person 102c spent at the premises 202.

Figure 2C:
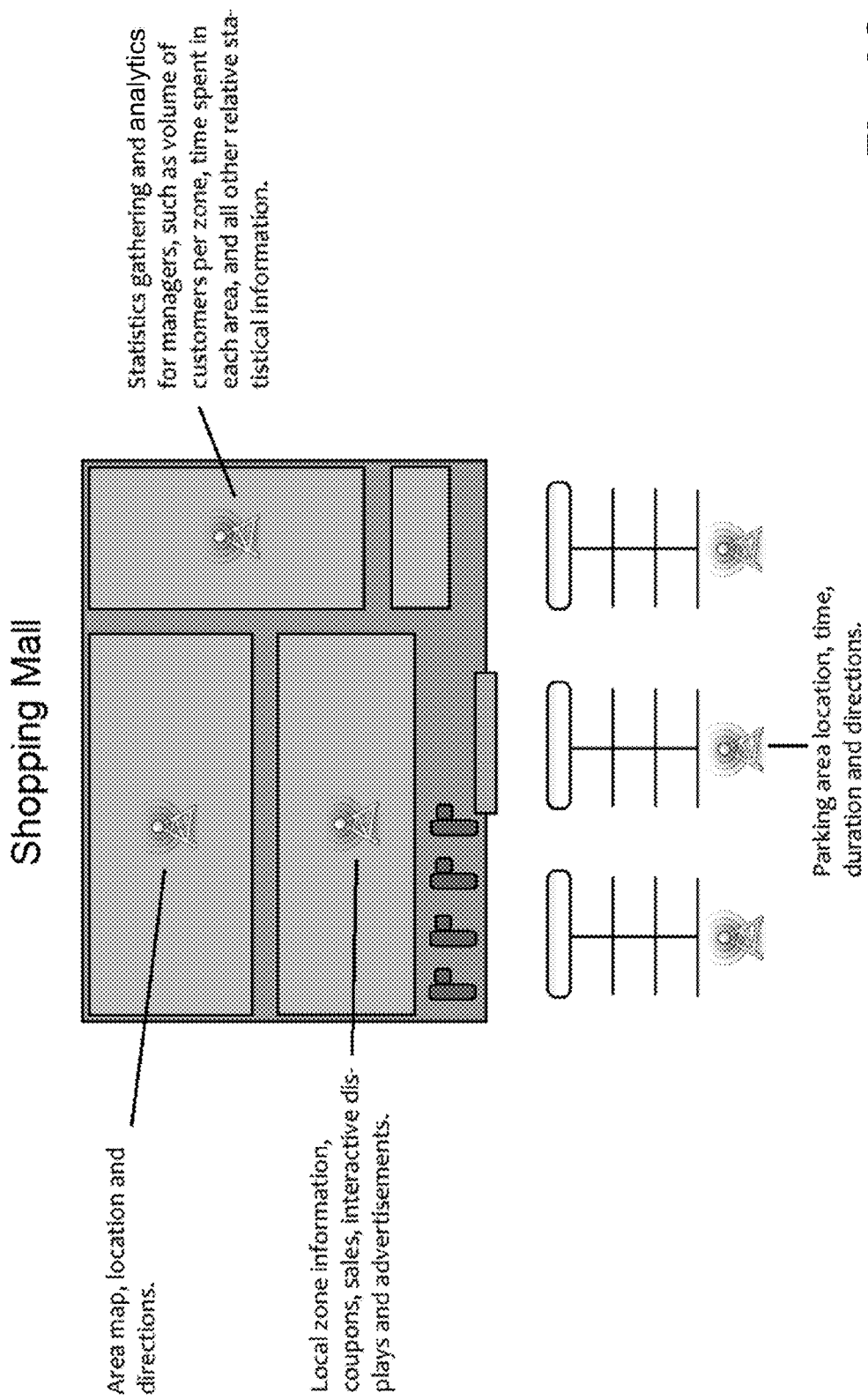

FIG. 2C illustrates a shopping mall embodiment. In this embodiment, tracking devices are located in the parking lot as well as interior locations. In addition to performing tracking functions, the system is configured to provide information to users (e.g., customers) as they visit the mall. For example, the system will record the location at which the customer parked, in order to inform the customer of that location when they depart. Also, as the customer may be provided with special location-specific offers, coupons, interactive information, maps, and the like. Managers can gather information about how many customers are visiting the mall, time spent in various areas, and the like.

Figure 2D:
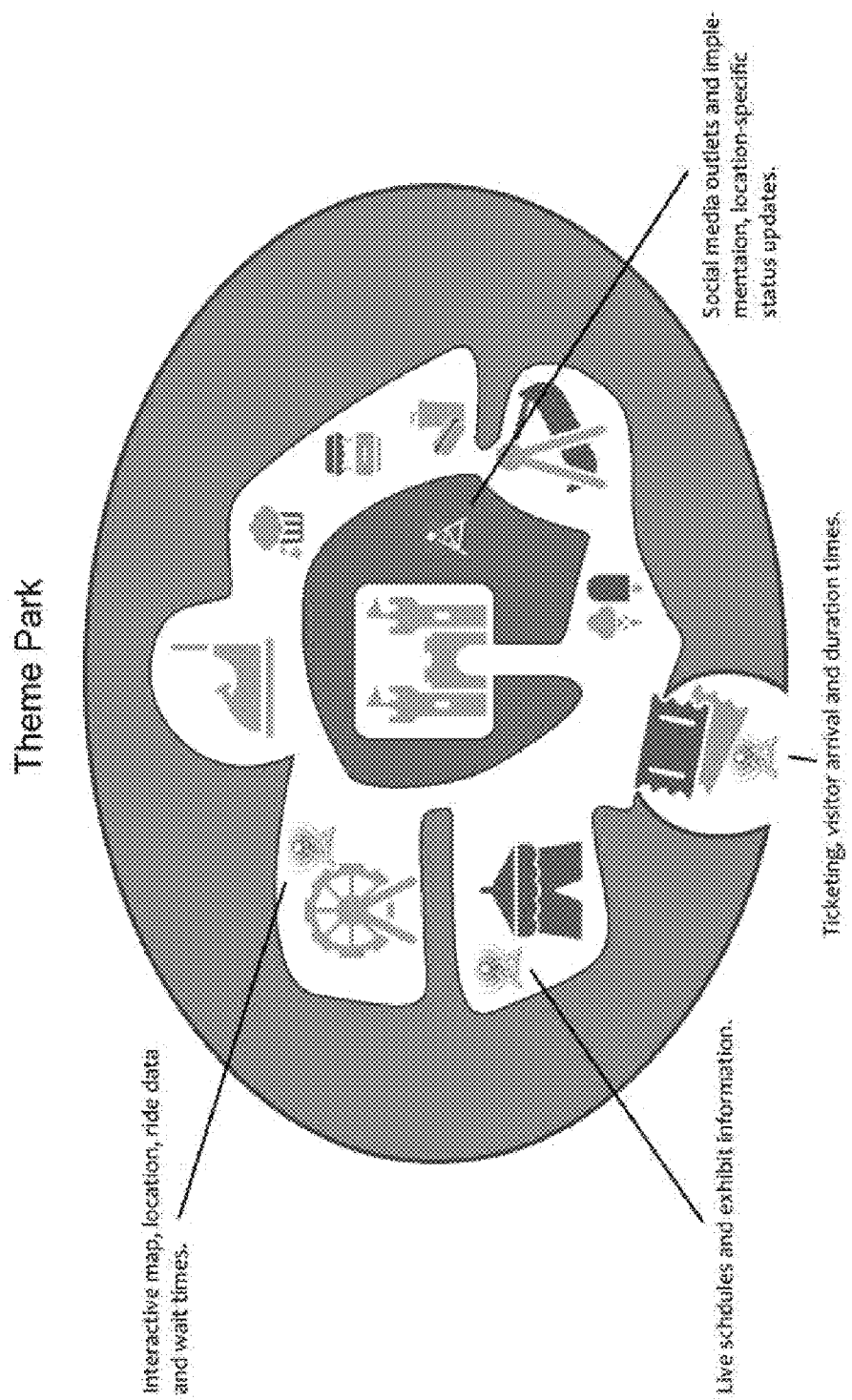

FIG. 2D illustrates an amusement park embodiment. In this embodiment, customers may be provided with maps, wait time information, schedules, exhibit information, and the like. Managers can track information about visitor patterns, wait times, and the like.

Figure 3A:
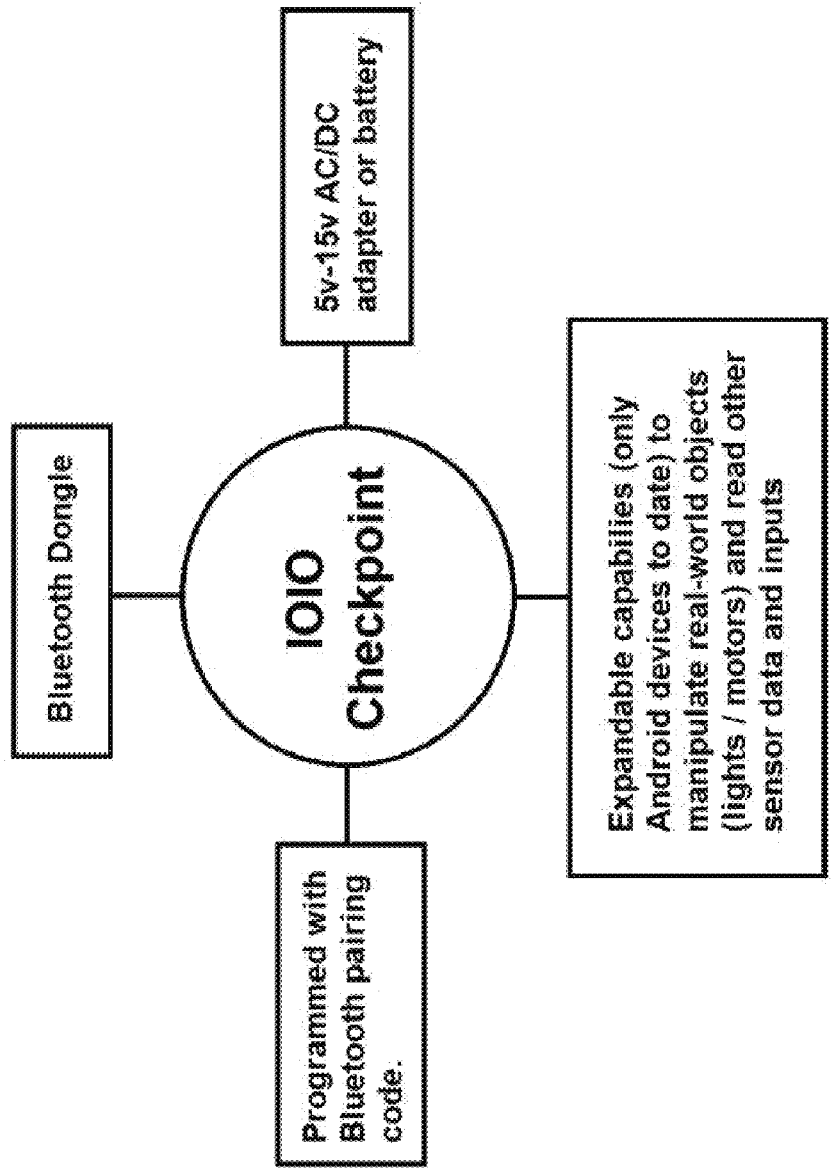
FIG. 3A is a flow diagram illustrating operation of a checkpoint device according to an example embodiment.

FIG. 3A is a flow diagram illustrating operation of a checkpoint device according to an example embodiment. In the illustrated embodiment, checkpoint devices are implemented by way of IOIO single-board microcontrollers. Each checkpoint is a single IOIO unit with a Bluetooth dongle, powered by a low-voltage ac-adapter or any 5-15v power source, including batteries for remote locations. The IOIO board is programmed with a Bluetooth password (which can be unique or the same for all IOIOs on-site) and makes a secure encrypted connection to the mobile device of the tracked person, with the IOIOs expandable capabilities to manipulate real-world objects such as lights and to read other sensor data such as motion detectors or the status of an electrical circuit (e.g., onoff status of lights, temperature sensors).

Other implementations are contemplated, including via Arduino boards, other microcontrollers, system-on-chip, and the like. Also, as noted above, some checkpoint devices are conventional Wi-Fi capable devices, such as wireless access pointsrouters, media sharing devices, or the like.

Figure 3B:
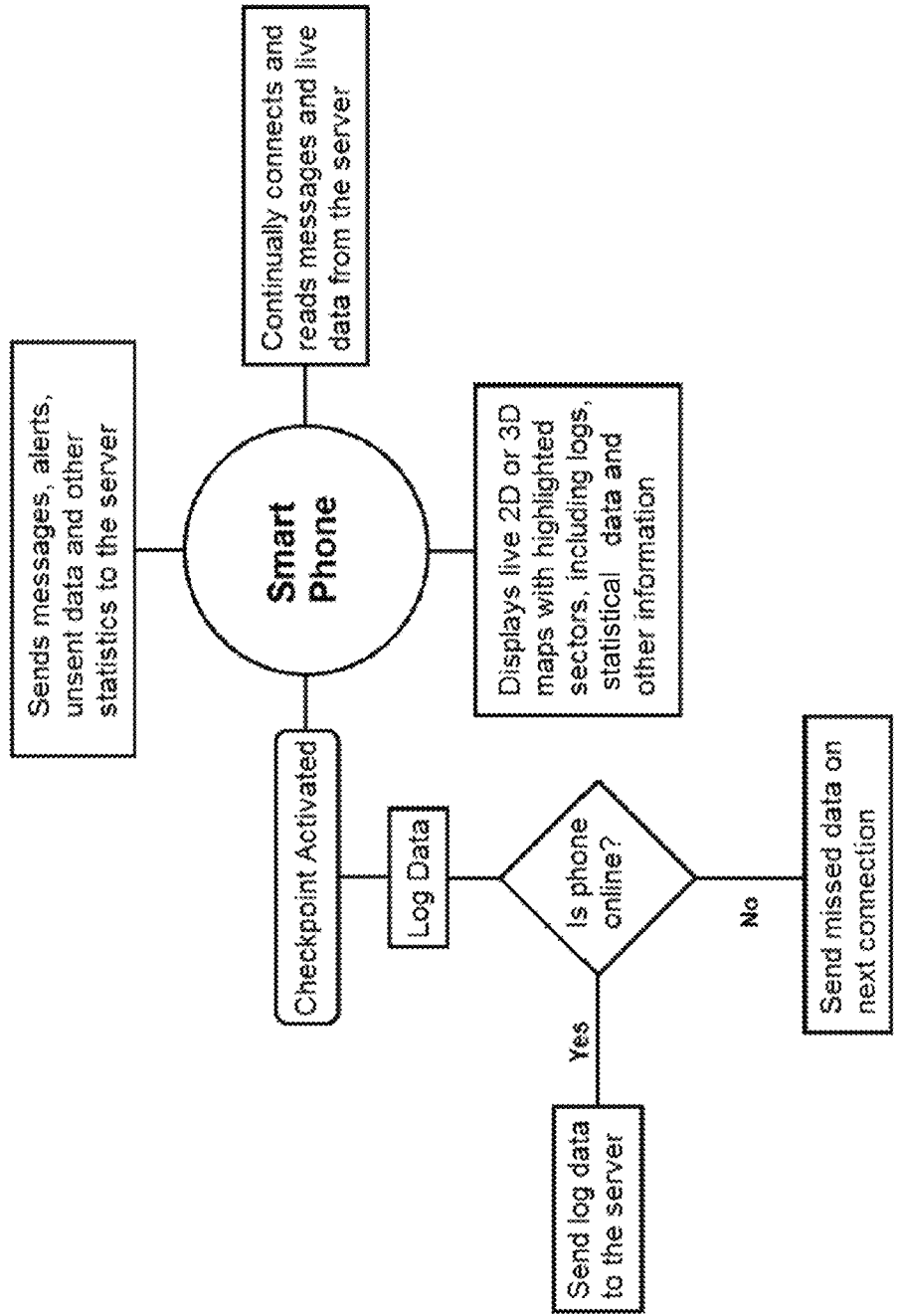
FIG. 3B is a flow diagram illustrating operation of a mobile device according to an example embodiment.

FIG. 3B is a flow diagram illustrating operation of a mobile device according to an example embodiment. In the illustrated embodiment, the mobile device of a tracked person sends updated checkpoint and log information to the tracking system database, while also reading the current information from the tracking system every few seconds held live in the database, such as locations of other tracked persons, messages, ongoing incidents, etc. The mobile device can also locally store checkpoint information when the device is not online or otherwise able to communicate with the tracking system. The next time the mobile device is online, locally stored checkpoint information will be transmitted.

As noted the mobile device is typically a smart phone, but may instead or in addition be a tablet computer, a wrist computer, wearable computer, or the like. In the illustrated embodiment, the mobile device is an Android-based device, although other operating systems or platforms may be used, including Apple iOS, Microsoft Windows Phone, Linux, or the like.

Figure 3C:
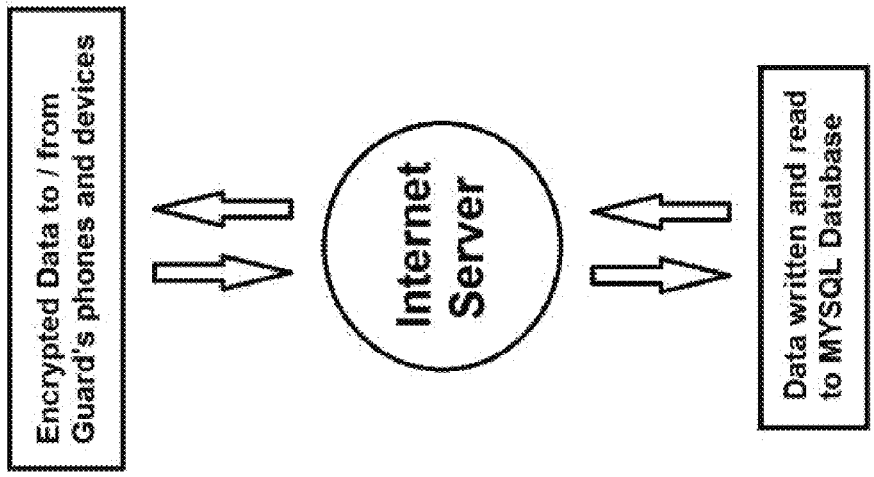
FIG. 3C is a block diagram of a tracking system according to an example embodiment.

FIG. 3C is a block diagram of a tracking system according to an example embodiment. The tracking system in the illustrated embodiment is any server with Internet visibility. The example tracking system uses a MySQL database. The database can easily be backed-up at any time while site operations continue uninterrupted. The use of other types of databases or data stores are contemplated, including SQL Server, PostgreSQL, Apache Derby, SQLlite, Amazon SimpleDB, MongoDB, or the like.

FIGS. 4A-4H illustrate user interface screens provided by an example embodiment. The illustrated user interface screens are typically provided by a mobile device, such as a smart phone, tablet, or the like.

Figure 4B:
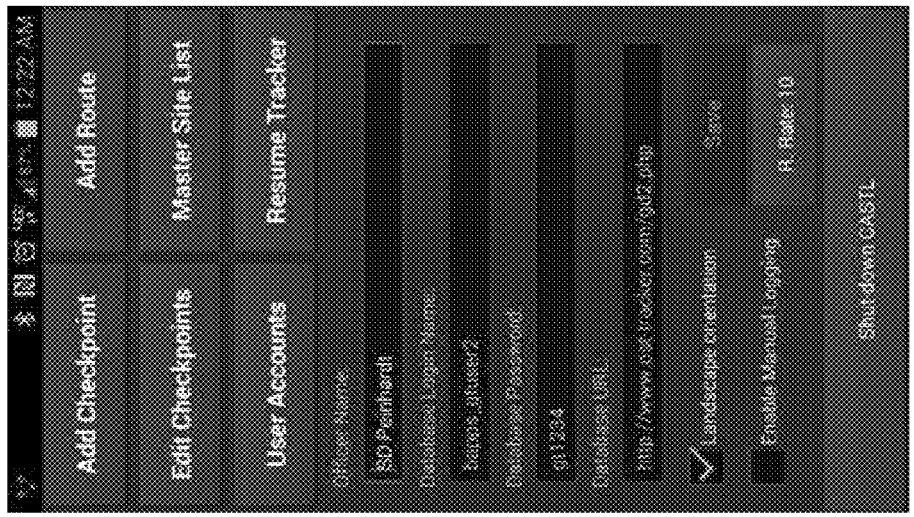
FIGS. 4A-4H illustrate user interface screens provided by an example embodiment.
Figure 4A:
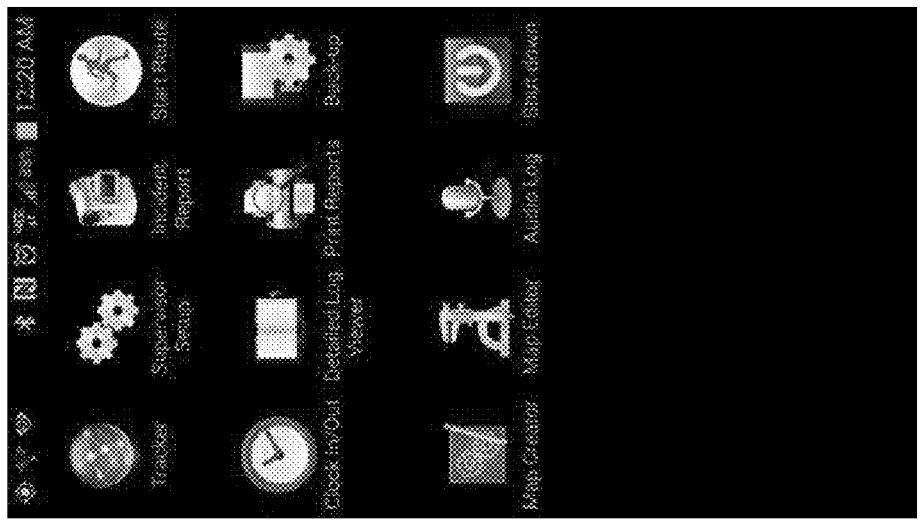

FIG. 4A illustrates a home screen that provides access to functions such as tracking, supervisor setup, incident reports, route management, timekeeping, map editing, and the like.

FIGS. 4B-4G illustrate checkpoint management screens. These facilitate the generation of new checkpoints and/or modification or deletion of existing checkpoints. FIG. 4B shows an initial screen that can be used by a supervisor to gain access to the checkpoint management functionality.

Figure 4D:
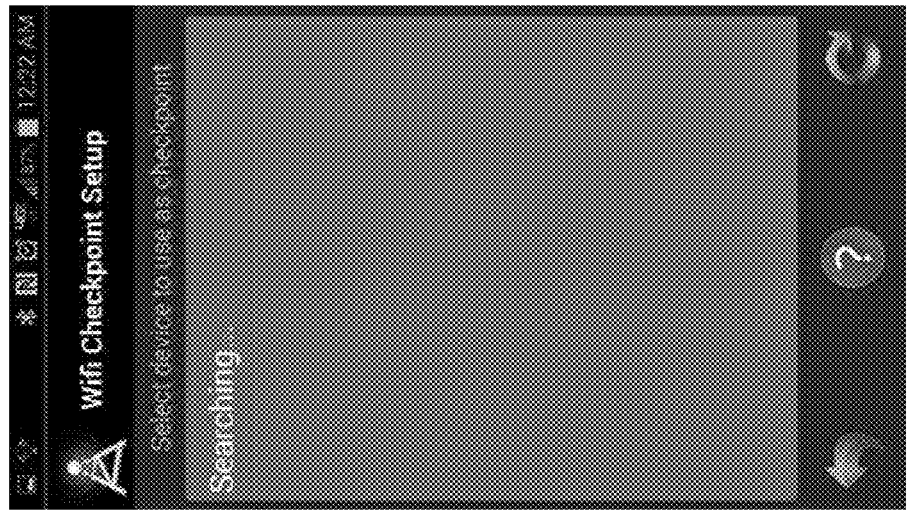
Figure 4C:
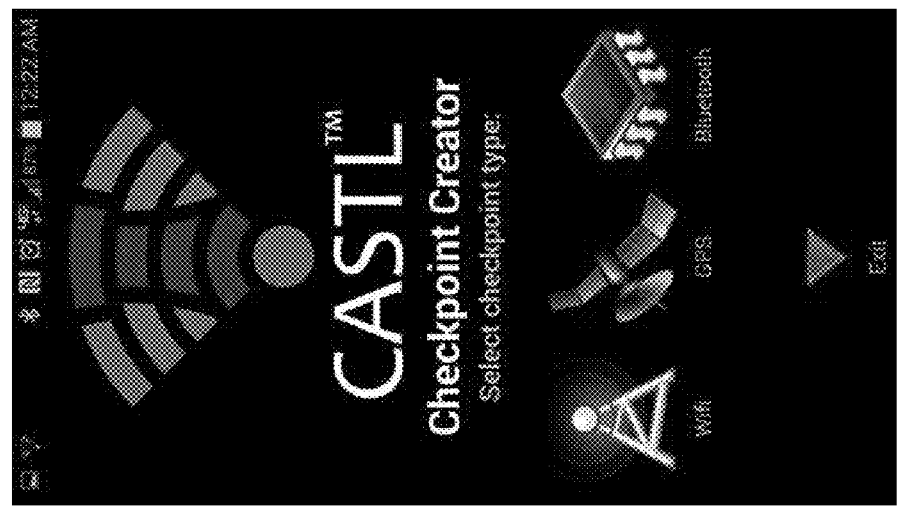

FIG. 4C shows a new checkpoint screen. With this screen, the user can select the checkpoint type from one of Wi-Fi, GPS, or Bluetooth. In FIG. 4D, the user has selected a new Wi-Fi checkpoint setup, and in response, the mobile device begins scanning for available Wi-Fi devices.

Figure 4F:
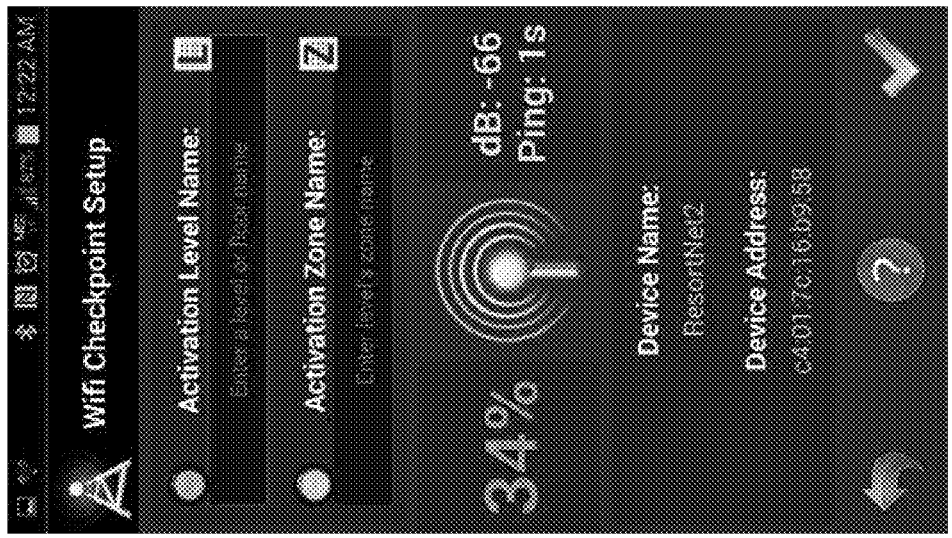
Figure 4E:
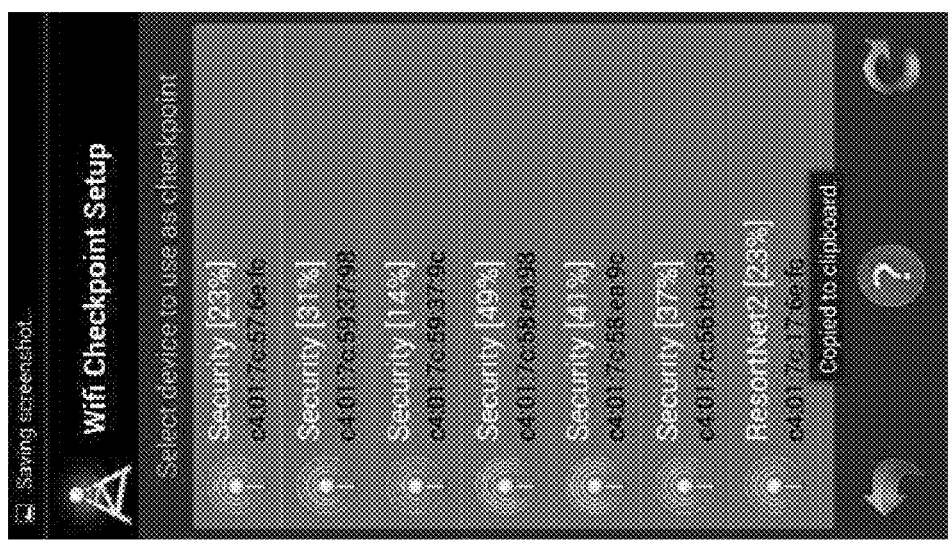

FIG. 4E shows a list of Wi-Fi devices that are available to serve as checkpoint devices. Each device is shown by its SSID, MAC address, and signal strength. Typically, the user will select the checkpoint device having the strongest signal. In some cases the user will select some other checkpoint device, such as because the user knows that a particular device is soon to be taken off line. In some embodiments, multiple checkpoint devices may be selected (either manually or automatically), so that a "fingerprint" may be established for a given location. In particular, at a particular location in a building having multiple checkpoint devices, the particular set of available devices and their corresponding signal strengths may be unique to that location. As such, a set of checkpoint devices and corresponding signal strengths may establish a pattern that corresponds to a specific location of the building. This pattern can later be used to determine the location of a tracked device, by comparing the pattern of received signals in the tracked device with previously stored patterns. Such patterns can be represented as vectors of signal strengths, and then location may be determined by vector similarity (e.g., cosine distance, Euclidian distance).

FIG. 4F illustrates the generation of a new checkpoint. In FIG. 4F, the user has selected one of the Wi-Fi devices from the list shown in FIG. 4E. With this screen, the user can enter the level or floor for the checkpoint and the name of the checkpoint. Note that the floor need not necessarily be the same as the location of the checkpoint device, because the checkpoint device having the strongest signal may be a floor above or below the user at the current location.

Figure 4H:
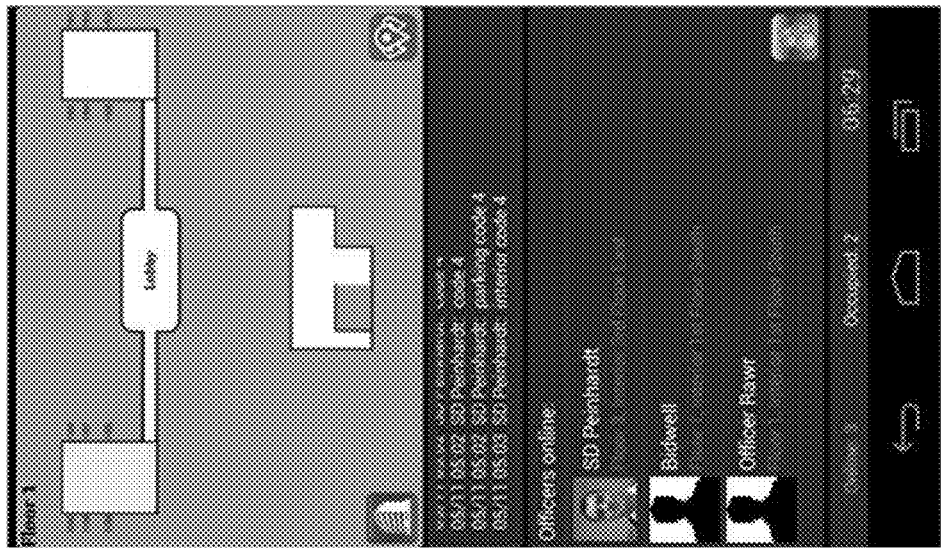
Figure 4G:
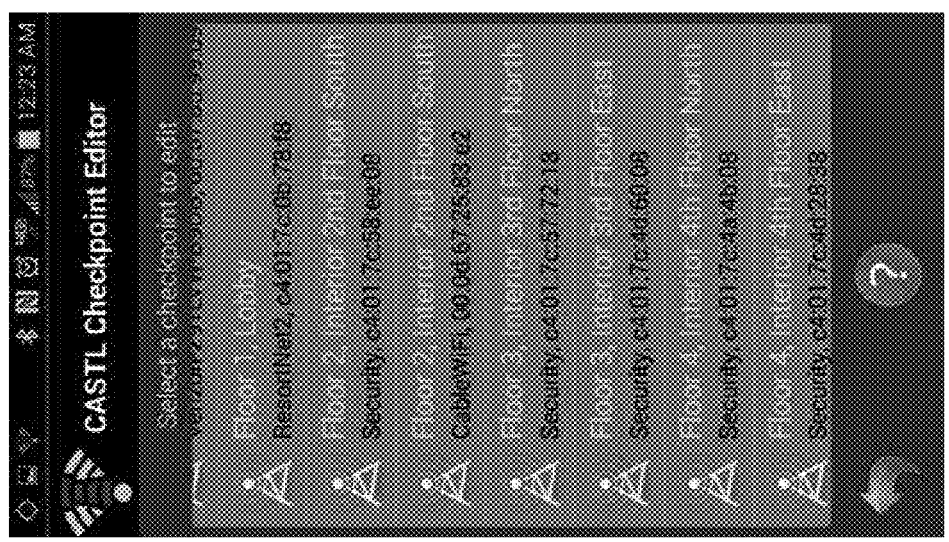

FIG. 4G illustrates a checkpoint editor screen. With this screen, the user can select a checkpoint and edit or delete is, such as by updating the name, floor, or other information.

FIG. 4H illustrates a tracking screen. This screen may be presented to a supervisor, guard, or other user. The screen shows a map of the premises, along with information about current locations of tracked guards.

2. Example Processes

FIGS. 5A-5G are flow diagrams of tracking processes performed by example embodiments.

FIG. 5A is an example flow diagram of example logic in a mobile device carried by a tracked person. More particularly, FIG. 5A illustrates a process 5100 that includes operations performed by or at the following block(s).

At block 5101, the process performs tracking movement of the person about a monitored premises that includes multiple checkpoint devices that are configured to communicate wirelessly with the mobile device, by: performing operation(s) of block(s) 5102, 5103, 5104 and 5105, described below.

At block 5102, the process performs wirelessly receiving checkpoint data from a first one of the checkpoint devices. In some embodiments, the mobile device receives the checkpoint data via Wi-Fi, although other wireless protocols may be employed, including Bluetooth, infrared, or the like. The data received may include a checkpoint identifier, such as a unique identifier that is associated with the checkpoint device and/or its location. In some embodiments, the mobile device receives an SSID and/or MAC address of a the checkpoint device, and uses this as the unique identifier. Note that in some embodiments, the checkpoint device may be a conventional wireless-capable device that is not specially configured in any way.

At block 5103, the process performs determining whether or not the checkpoint data can be transmitted to a remote tracking system. In some embodiments, communication between the mobile device and the tracking system may be intermittent. When communication is not possible, such as because there is no cellular signal, the mobile device may locally store or cache the checkpoint data until a later time.

At block 5104, the process performs when it is determined that the checkpoint data can be transmitted, transmitting the checkpoint data to the tracking system. The transmitted checkpoint data may include recently received and/or previously stored checkpoint data, including checkpoint identifiers, time stamps, and the like. Other information is typically included, such as mobile device or user identifiers, device information (e.g., battery level, signal strength), or the like.

At block 5105, the process performs when it is determined that the checkpoint data cannot be transmitted, locally storing the checkpoint data for later transmission to the tracking system. The checkpoint data may be securely stored locally until a future time when the mobile device can again communicate with the tracking system. The checkpoint data can also be stored for reasons, such as because the device is configured to save power by only transmitting every minute or some other time schedule (e.g., possibly based on battery level, such that fewer or less frequent transmissions are made as the batter level declines).

FIG. 5B is an example flow diagram of example logic illustrating an example embodiment of process 5100 of FIG. 5A. More particularly, FIG. 5B illustrates a process 5200 that includes the process 5100, and which further includes operations performed by or at the following block(s).

At block 5201, the process performs receiving tracking information from the tracking server. The received information may include the locations and/or identifiers of other tracked persons at the monitored premises.

At block 5202, the process performs presented the received tracking information on a display of the mobile device. The presented information may include a map or other output of the locations or movements of other tracked persons at the monitored premises.

FIG. 5C is an example flow diagram of example logic illustrating an example embodiment of process 5200 of FIG. 5B. More particularly, FIG. 5C illustrates a process 5300 that includes the process 5200, wherein the monitored premises is a multistory building including multiple levels, and which further includes operations performed by or at the following block(s).

At block 5301, the process performs presenting a map that displays a present location and an indication of a current level of the person within the monitored premises. In some embodiments, a multi-level map may be provided, so that the location and level of the tracked person can be displayed. Other display techniques are contemplated, including highlighting rooms or areas about or near the current location of the tracked person, a track or path of the tracked person through the building, or the like.

Figure 5D:
Figure 5D:

FIG. 5D is an example flow diagram of example logic illustrating an example embodiment of process 5100 of FIG. 5A. More particularly, FIG. 5D illustrates a process 5400 that includes the process 5100, and which further includes operations performed by or at the following block(s).

At block 5401, the process performs wirelessly receiving checkpoint data from a second one of the checkpoint devices. In some cases, the mobile device may concurrently receive checkpoint data from multiple distinct checkpoint devices, such as one located at the beginning of a hallway and another at the end of the hallway.

At block 5402, the process performs determining a nearest one of the first and second checkpoint devices. The mobile device may determine which checkpoint is the nearest in various ways, such as based on signal strength (e.g., the strongest signal likely corresponds to the nearest checkpoint device), location history (e.g., by reference to a known, planned, or previous route taken by the tracked person through the premises), or the like.

At block 5403, the process performs transmitting checkpoint data from the nearest one of the checkpoint devices to the tracking system. Having determined the nearest checkpoint, the mobile device notifies the tracking system of this fact. In other embodiments, the mobile device instead or in addition notifies the tracking system of all of the checkpoints (possibly along with information such as signal strength) with which it has communicated over a predetermined time interval (e.g., the last 10 seconds) so that the tracking system can attempt to determine the location of the tracked person based on this information.

FIG. 5E is an example flow diagram of example logic in a tracking system in communication with a mobile device carried by a tracked person. More particularly, FIG. 5E illustrates a process 5500 that includes operations performed by or at the following block(s).

At block 5501, the process performs tracking movement of the person about a monitored premises that includes multiple checkpoint devices that are configured to communicate wirelessly with the mobile device, wherein at least some of the checkpoint devices are Wi-Fi network access devices, by: performing operation(s) of block(s) 5502, 5503 and 5504, described below. The tracking system interacts with one or more mobile devices carried by tracked persons, as described above. In doing so, it receives checkpoint data, stores that data, and presents tracking information based on the store data.

At block 5502, the process performs receiving checkpoint data from the mobile device, the checkpoint data based on a wireless interaction between the mobile device and one or more of the multiple checkpoint devices, the checkpoint data including network identifiers of the Wi-Fi network access devices. In general, the checkpoint data may include data received by the mobile device from a checkpoint device (e.g., a checkpoint device identifier) and/or data generated by the mobile device itself (e.g., a time stamp, a mobile device identifier). As discussed above, in some embodiments, the checkpoint devices are wireless network access devices, such as Wi-Fi access points, routers, or media devices. In such cases, the mobile device reads a network identifier associated with the wireless network access device, such as a MAC address or SSID. This identifier is then transmitted to the tracking server or other devicesystem as part of the checkpoint data.

At block 5503, the process performs storing checkpoint data received from the mobile device. As noted, the checkpoint data may be stored in a database or other persistent data store.

At block 5504, the process performs presenting tracking information based on the received checkpoint data. Other or additional functions may be performed, including preparing and providing reports, analyzing the movements of tracked persons, detecting anomalous conditions (e.g., when a tracked person is not moving for a predetermined time interval), or the like.

FIG. 5F is an example flow diagram of example logic illustrating an example embodiment of process 5500 of FIG. 5E. More particularly, FIG. 5F illustrates a process 5600 that includes the process 5500, wherein the tracking movement of the person includes operations performed by or at one or more of the following block(s).

At block 5601, the process performs receiving from the mobile device checkpoint data corresponding to multiple checkpoint devices, the received checkpoint data identifying each of the checkpoint devices and including a signal strength corresponding to each of the checkpoint devices. The mobile device may scan and transmit information about multiple distinct checkpoint devices. This information may include, for each device, an identifier, a signal strength, and possibly other information.

At block 5602, the process performs determining, based on the signal strength corresponding to each of the multiple checkpoint devices, a location of the mobile device. Various techniques may be employed. For example, the system may determine that the mobile device is located at or about the checkpoint device corresponding to the strongest signal. In other embodiments, the system may average or triangulate the location of the checkpoint device, such as by estimating that the mobile device is equidistant from two checkpoint devices having equally strong signals, as described above. Other information may also or instead be used, such as past location information (e.g., the previous location of the guard), maximum signal strengths associated with checkpoint devices, transmission characteristics (e.g., structures, atmospheric conditions), or the like.

FIG. 5G is an example flow diagram of example logic illustrating an example embodiment of process 5500 of FIG. 5E. More particularly, FIG. 5G illustrates a process 5700 that includes the process 5500, wherein the tracking movement of the person includes operations performed by or at one or more of the following block(s).

At block 5701, the process performs receiving multiple checkpoint identifiers. In some embodiments, the system is initially configured by traveling the monitored premises and sampling the wireless signals present at various locations. At each location, an identifier (e.g., SSID) associated with the strongest wireless signal is transmitted to the tracking server, along with an indicator of the current location.

At block 5702, the process performs for each of the multiple checkpoint identifiers, receiving a corresponding location indicator. The location indicator may be or include one or more of a textual description (e.g., "hallway," "room 201"), an image of the location, one or more coordinates, or the like.

At block 5703, the process performs associating each of the multiple checkpoint identifiers with its corresponding location indicator. The tracking system may associate this information in a database or similar data repository, so that it may be efficiently referenced when checkpoint data is later received during tracking.

FIG. 5H is an example flow diagram of example logic illustrating an example embodiment of process 5700 of FIG. 5G. More particularly, FIG. 5H illustrates a process 5800 that includes the process 5700, and which further includes operations performed by or at the following block(s).

At block 5801, the process performs presenting on a mobile device identifiers of multiple candidate checkpoint devices, each identifier presented with an associated signal strength. As shown in FIGS. 4A-4H, above, a mobile device may used to setup checkpoints. In some embodiments, the mobile device displays identifiers of the checkpoints (e.g., Wi-Fi access points) that are available at a current location of the device. The checkpoints are displayed along with information about the corresponding signal strength of each checkpoint.

At block 5802, the process performs receiving, based on a selection by a user of the mobile device of one of the presented checkpoint device identifiers, the selected checkpoint device identifier, a zone identifier, and a level identifier. The user can then select the checkpoint having the strongest signal, or some other checkpoint. The user can also specify checkpoint data, such as a user-friendly name, a zone, a level (e.g., floor), or the like. In response, the mobile device transmits to the tracking server (or other system) the identifier of the selected device along with the other information provided by the user.

At block 5803, the process performs associating the selected checkpoint device identifier with the zone identifier and the level identifier.

3. Example Computing System Implementation

Figure 6:
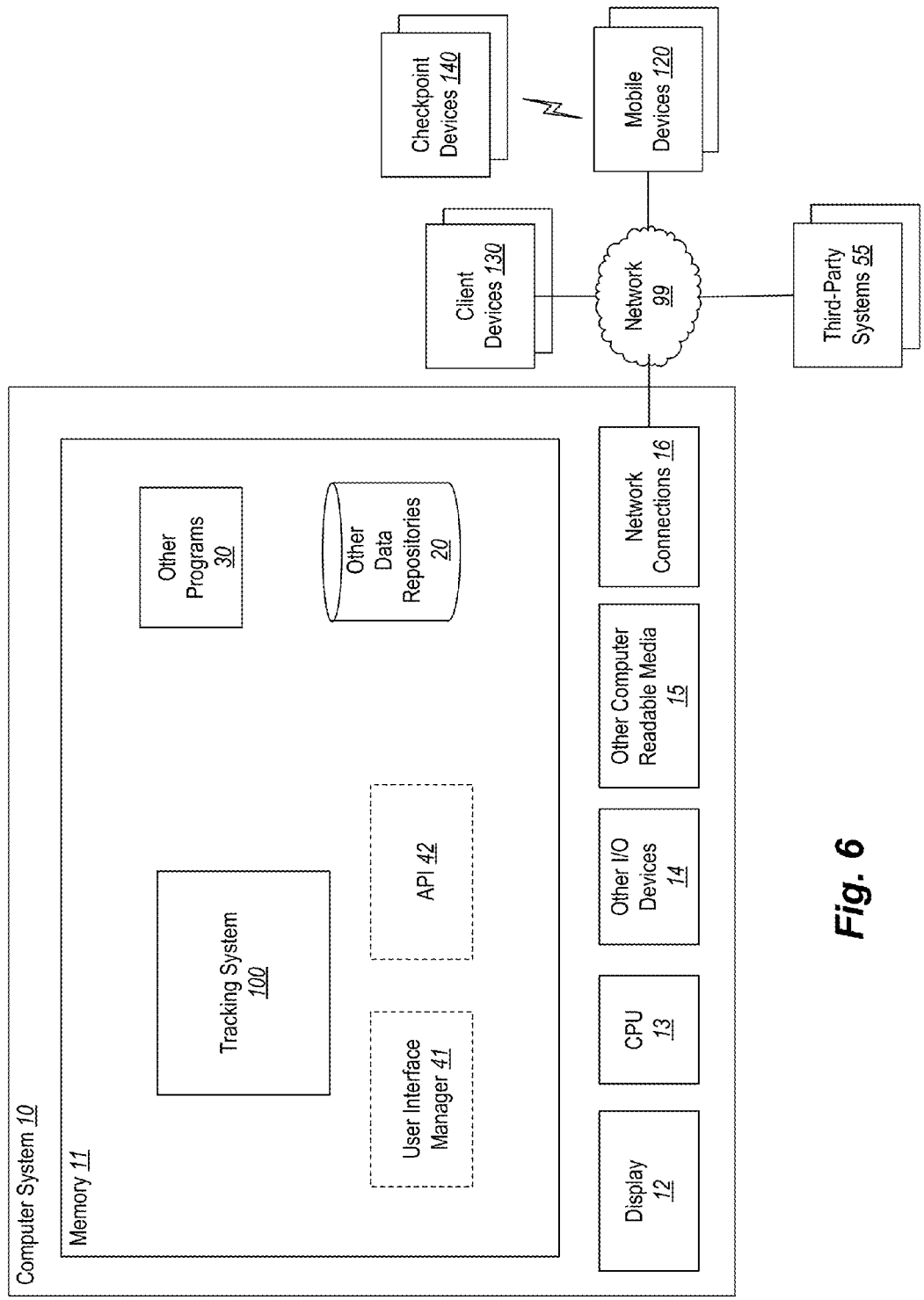
FIG. 6 is a block diagram of an example computing system for implementing a tracking system according to an example embodiment.

FIG. 6 is a block diagram of an example computing system for implementing a tracking system according to an example embodiment. In particular, FIG. 6 shows a computing system 10 that may be utilized to implement a tracking system 100. Also, at least some of the implementation techniques described below may be used to implement other devices, systems, or modules described herein, including the client device 130, the mobile device 120, and/or the checkpoint device 140 described with reference to FIG. 1, above.

Note that one or more general purpose or special purpose computing systems/devices may be used to implement the tracking system 100. In addition, the computing system 10 may comprise one or more distinct computing systems/devices and may span distributed locations. Furthermore, each block shown may represent one or more such blocks as appropriate to a specific embodiment or may be combined with other blocks. Also, the tracking system 100 may be implemented in software, hardware, firmware, or in some combination to achieve the capabilities described herein.

In the embodiment shown, computing system 10 comprises a computer memory ("memory") 11, a display 12, one or more Central Processing Units ("CPU") 13, Input/Output devices 14 (e.g., keyboard, mouse, CRT or LCD display, and the like), other computer-readable media 15, and network connections 16. The tracking system 100 is shown residing in memory 11. In other embodiments, some portion of the contents, some or all of the components of the tracking system 100 may be stored on and/or transmitted over the other computer-readable media 15. The components of the tracking system 100 preferably execute on one or more CPUs 13 and perform the techniques described herein. Other code or programs 30 (e.g., an administrative interface, a Web server, and the like) and potentially other data repositories, such as data repository 20, also reside in the memory 11, and preferably execute on one or more CPUs 13. Of note, one or more of the components in FIG. 6 may not be present in any specific implementation. For example, some embodiments may not provide other computer readable media 15 or a display 12.

The tracking system 100 is shown executing in the memory 11 of the computing system 10. Also included in the memory are a user interface manager 41 and an application program interface ("API") 42. The user interface manager 41 and the API 42 are drawn in dashed lines to indicate that in other embodiments, functions performed by one or more of these components may be performed externally to the tracking system 100.

The tracking system 100 interacts via the network 99 with client devices 130, mobile devices 120, and third-party systems/applications 55. The network 99 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication between remotely situated humans and/or devices. The third-party systems/applications 55 may include any systems that provide data to, or utilize data from, the tracking system 100, including Web browsers, third-party security/monitoring systems, communication systems (e.g., SMS text message gateways), and the like.

The UI manager 41 provides a view and a controller that facilitate user interaction with the tracking system 100 and its various components. For example, the UI manager 41 may provide interactive access to the tracking system 100, such that users can interact with the tracking system 100, such as by obtaining interactive map-based views of tracked premises. In some cases, users may configure the operation of the tracking system 100, such as by providing the tracking system 100 with information about the locations of checkpoint devices 140, map information, user information, or the like. In some embodiments, access to the functionality of the UI manager 41 may be provided via a Web server, possibly executing as one of the other programs 30. In such embodiments, a user operating a Web browser executing on one of the client devices 130 or mobile devices 120 can interact with the tracking system 100 via the UI manager 41.

The API 42 provides programmatic access to one or more functions of the tracking system 100. For example, the API 42 may provide a programmatic interface to one or more functions of the tracking system 100 that may be invoked by one of the other programs 30 or some other module. In this manner, the API 42 facilitates the development of third-party software, such as user interfaces, plug-ins, adapters (e.g., for integrating functions of the tracking system 100 into Web applications), and the like.

In addition, the API 42 may be in at least some embodiments invoked or otherwise accessed via remote entities, such as code executing on one of the client devices 130, mobile devices 120, and/or one of the third-party systems/ applications 55, to access various functions of the tracking system 100. For example, a mobile device 120 may push checkpoint data received from the checkpoint devices 140 to the tracking system 100 via the API 42. The API 42 may also be configured to provide management widgets (e.g., code modules) that can be integrated into the third-party applications 55 and that are configured to interact with the tracking system 100 to make at least some of the described functionality available within the context of other applications (e.g., mobile apps).

In an example embodiment, components/modules of the tracking system 100 are implemented using standard programming techniques. For example, the tracking system 100 may be implemented as a "native" executable running on the CPU 13, along with one or more static or dynamic libraries. In other embodiments, the tracking system 100 may be implemented as instructions processed by a virtual machine that executes as one of the other programs 30. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use either well-known or proprietary synchronous or asynchronous client-server computing techniques. Also, the various components may be implemented using more monolithic programming techniques, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the tracking system 100, such as in the data stores 116 and/or 20, can be available by standard mechanisms such as through C, C++, C#, and Java APIs; libraries for accessing files, databases, or other data repositories; through scripting languages such as XML; or through Web servers, FTP servers, or other types of servers providing access to stored data. The data stores 116 and/or 20 may be implemented as one or more database systems, file systems, or any other technique for storing such information, or any combination of the above, including implementations using distributed computing techniques.

Different configurations and locations of programs and data are contemplated for use with techniques of described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the tracking system 100 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the components and/or data structures may be stored on tangible, non-transitory storage mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

All of the above U.S. patents, U.S. patent application publications, U.S. patent applications, foreign patents, foreign patent applications, non-patent publications, and appendixes referred to in this specification and/or listed in the Application Data Sheet, including but not limited to U.S. Provisional Patent Application No. 61/912,919, filed on Dec. 6, 2013 and entitled "TRACKING SYSTEMS AND METHODS," is incorporated herein by reference, in its entirety.

From the foregoing it will be appreciated that, although specific embodiments have been described herein for purposes of illustration, various modifications may be made without deviating from the spirit and scope of this disclosure. For example, the methods, techniques, and systems for person tracking are applicable to other architectures or in other settings. For example, instead of tracking guards, at least some of the techniques may be employed to track other types or roles of employee, such as medical staff, maintenance or housekeeping staff, or the like. Also, the methods, techniques, and systems discussed herein are applicable to differing protocols, communication media (optical, wireless, cable, etc.) and devices (e.g., desktop computers, wireless handsets, electronic organizers, personal digital assistants, tablet computers, portable email machines, game machines, pagers, navigation devices, etc.).

The invention claimed is:

1. A method in a mobile device carried by a tracked person, the method comprising:
   editing a map of a monitored premises that includes multiple checkpoint devices that are configured to communicate wirelessly with the mobile device, by:
      presenting, on a screen of the mobile device, identifiers of multiple candidate checkpoint devices, each identifier presented with an associated signal strength;
      receiving, based on a selection by a user of the mobile device of one of the presented checkpoint device identifiers, the selected checkpoint device identifier, a zone identifier, and a level identifier, wherein the checkpoint device identifier, the zone identifier, and the level identifier are specified by the user via a screen presented on the mobile device; and
      transmitting to a remote tracking system the selected checkpoint device identifier with the zone identifier and the level identifier; and
   tracking movement of the person about the monitored premises, by:
      wirelessly receiving checkpoint data from multiple checkpoint devices, wherein the checkpoint data includes a network identifier of each of the checkpoint devices and a signal strength corresponding to each of the checkpoint devices;
      determining whether or not the checkpoint data can be transmitted to the remote tracking system;
      when it is determined that the checkpoint data can be transmitted, transmitting the checkpoint data to the remote tracking system, thereby causing the remote tracking system to determine, based on the signal strength corresponding to each of the multiple checkpoint devices, a location of the mobile device, by:
         estimating the location of the mobile device as being on a first line that is perpendicular to a second line that runs from a first checkpoint device to a second checkpoint device;
         estimating, based on a signal strength corresponding to the first checkpoint device and a signal strength corresponding to the second checkpoint device, a position along the first line with respect to the second line; and
         calculating vector similarity between a first vector and a second vector, wherein the first vector represents a first pattern of signal strength information received from the multiple check point devices at a first time, and wherein the second vector represents a second pattern of signal strength information received from the multiple check point devices at a second time; and
      when it is determined that the checkpoint data cannot be transmitted, locally storing the checkpoint data for later transmission to the remote tracking system.

2. The method of claim 1, further comprising:
   receiving tracking information from the remote tracking system; and
   presenting the received tracking information on a display of the mobile device.

3. The method of claim 2, wherein the monitored premises is a multistory building including multiple levels, and further comprising: presenting a map that displays a present location and an indication of a current level of the person within the monitored premises.

4. The method of claim 1, further comprising:
   wirelessly receiving checkpoint data from a first and a second one of the checkpoint devices;
   determining a nearest one of the first and second checkpoint devices; and
   transmitting checkpoint data from the nearest one of the checkpoint devices to the remote tracking system.

5. The method of claim 1, wherein the wirelessly receiving checkpoint data includes: receiving the checkpoint data via the Wi-Fi protocol.

6. The method of claim 1, wherein the wirelessly receiving checkpoint data includes: receiving a device identifier associated with the first checkpoint device.

7. The method of claim 1, wherein the determining whether or not the checkpoint data can be transmitted includes: determining whether a network connection can be established for communicating with the remote tracking system.

8. The method of claim 1, wherein the determining whether or not the checkpoint data can be transmitted includes: determining whether the mobile device is in a power-saving mode.

9. The method of claim 1, wherein the transmitting the checkpoint data to the remote tracking system includes: transmitting multiple checkpoint identifiers along with associated time stamps that each indicate a time at which the mobile device communicated with a one of the multiple checkpoint devices.

10. The method of claim 1, wherein the tracking movement of the person includes: tracking the movement of at least one of: a guard monitoring the premises, a maintenance worker operating at the premises, a janitorial worker operating at the premises, a family or group member visiting the premises, and a health care worker providing services within the premises.

11. The method of claim 1, wherein calculating vector similarity includes calculating cosine similarity between the first vector and the second vector.

12. A method in a tracking system in communication with a mobile device carried by a tracked person, the method comprising:
    editing a map of a monitored premises that includes multiple checkpoint devices that are configured to communicate wirelessly with the mobile device, wherein at least some of the checkpoint devices are Wi-Fi network access devices, by:
        presenting, on a screen of the mobile device, identifiers of multiple candidate checkpoint devices, each identifier presented with an associated signal strength; and
        receiving, based on a selection by a user of the mobile device of one of the presented checkpoint device identifiers, the selected checkpoint device identifier, a zone identifier, and a level identifier, wherein the checkpoint device identifier, the zone identifier, and the level identifier are specified by the user via a screen presented on the mobile device; and
    tracking movement of the person about the monitored premises, by:
        receiving checkpoint data from the mobile device, the checkpoint data based on a wireless interaction between the mobile device and multiple checkpoint devices, wherein the checkpoint data includes a network identifier of each of the checkpoint devices and a signal strength corresponding to each of the checkpoint devices;
        storing checkpoint data received from the mobile device;
        determining, based on the signal strength corresponding to each of the multiple checkpoint devices, a location of the mobile device, by:
            estimating the location of the mobile device as being on a first line that is perpendicular to a second line that runs from a first checkpoint device to a second checkpoint device;
            estimating, based on a signal strength corresponding to the first checkpoint device and a signal strength corresponding to the second checkpoint device, a position along the first line with respect to the second line; and
            calculating vector similarity between a first vector and a second vector, wherein the first vector represents a first pattern of signal strength information received from the multiple check point devices at a first time, and wherein the second vector represents a second pattern of signal strength information received from the multiple check point devices at a second time; and
        presenting tracking information including the determined location based on the received checkpoint data.

13. The method of claim 12, wherein the tracking movement of the person includes:
    receiving multiple checkpoint identifiers;
    for each of the multiple checkpoint identifiers, receiving a corresponding location indicator; and
    associating each of the multiple checkpoint identifiers with its corresponding location indicator.

14. The method of claim 12, wherein calculating vector similarity includes calculating cosine similarity between the first vector and the second vector.

15. A system for tracking movement of a tracked person about a monitored premises, the system comprising:
    a checkpoint device;
    a mobile device;
    a tracking server;
    wherein the mobile device is configured to edit a map of the monitored premises, by:
        presenting, on a screen of the mobile device, identifiers of multiple candidate checkpoint devices, each identifier presented with an associated signal strength;
        receiving, based on a selection by a user of the mobile device of one of the presented checkpoint device identifiers, the selected checkpoint device identifier, a zone identifier, and a level identifier, wherein the checkpoint device identifier, the zone identifier, and the level identifier are specified by the user via a screen presented on the mobile device; and
        transmitting to a remote tracking system the selected checkpoint device identifier with the zone identifier and the level identifier;
    wherein the mobile device is configured to track movement of the person about the monitored premises, by:
        wirelessly receiving checkpoint data from multiple checkpoint devices, wherein the checkpoint data includes a network identifier of each of the checkpoint devices and a signal strength corresponding to each of the checkpoint devices;
        determining whether or not the checkpoint data can be transmitted to the tracking server;
        when it is determined that the checkpoint data can be transmitted, transmitting the checkpoint data to the tracking server; and
        when it is determined that the checkpoint data cannot be transmitted, locally storing the checkpoint data for later transmission to the remote tracking system; and
    wherein the tracking server is configured to track movement of the person about the monitored premises, by:
        receiving the checkpoint data from the mobile device;
        storing checkpoint data received from the mobile device;

determining, based on the signal strength corresponding to each of the multiple checkpoint devices, a location of the mobile device, by:
- estimating the location of the mobile device as being on a first line that is perpendicular to a second line that runs from a first checkpoint device to a second checkpoint device;
- estimating, based on a signal strength corresponding to the first checkpoint device and a signal strength corresponding to the second checkpoint device, a position along the first line with respect to the second line; and
- calculating vector similarity between a first vector and a second vector, wherein the first vector represents a first pattern of signal strength information received from the multiple check point devices at a first time, and wherein the second vector represents a second pattern of signal strength information received from the multiple check point devices at a second time; and
- calculating vector similarity between a first vector and a second vector, wherein the first vector represents a first pattern of signal strength information received from the multiple check point devices at a first time, and wherein the second vector represents a second pattern of signal strength information received from the multiple check point devices at a second time; and presenting tracking information including the determined location based on the received checkpoint data, the presented information including a map that depicts the location of the tracked person with respect to the premises.

16. The system of claim 15, wherein the tracking server is further configured to: determine the location of the mobile device, based on the received checkpoint data and based on an association between checkpoint identifiers and locations.

17. The system of claim 15, wherein the checkpoint device is a Wi-Fi capable device, including one of a router, an access point, or a media device, and wherein the checkpoint device transmits its MAC address and/or SSID to the mobile device.

18. The system of claim 15, wherein calculating vector similarity includes calculating cosine similarity between the first vector and the second vector.

* * * * *